United States Patent
Lindenmeier et al.

(10) Patent No.: US 6,278,869 B1
(45) Date of Patent: Aug. 21, 2001

(54) RADIO SYSTEM FOR REMOTE CONTROL OPERATION IN A STATIONARY VEHICLE

(75) Inventors: Heinz Lindenmeier, Planegg; Jochen Hopf, Haar; Leopold Reiter, Gilching, all of (DE)

(73) Assignee: Fuba Automotive GmbH, Bad Salzdetfurth (DE)

( * ) Notice: Subject to any disclaimer, the term of this patent is extended or adjusted under 35 U.S.C. 154(b) by 0 days.

(21) Appl. No.: 09/307,039

(22) Filed: May 7, 1999

(30) Foreign Application Priority Data

May 25, 1998 (DE) .............................................. 198 23 237

(51) Int. Cl.⁷ ..................................................... H04B 7/08
(52) U.S. Cl. ........................ 455/277.1; 455/88; 455/352; 340/5.63; 340/825.69; 340/825.72
(58) Field of Search .............................. 455/277.1, 277.2, 455/88, 420, 352; 340/542, 825.69, 825.72, 5.63, 5.72

(56) References Cited

FOREIGN PATENT DOCUMENTS 196 07 045
A1 8/1997 (DE) .

*Primary Examiner*—Lee Nguyen
(74) *Attorney, Agent, or Firm*—Michael J. Striker

(57) ABSTRACT

The radio system for remote control operation in a stationary vehicle includes a transmitter outside of the vehicle which transmits a predetermined high frequency radio transmission in a meter wavelength band designed to be received only by a receiver located in the vehicle to the receiver (1) in a predetermined radio channel. The radio system includes at least two receiving antennas (2a,2b) mounted on the vehicle (5), which are decoupled from each other in a diversity-type manner in a frequency band of the radio channel and a respective one of these antennas is connected to the receiver tuned to this frequency channel with the help of a selection circuit (3) during a ready mode of the receiver (1). A clock (4), which sets a number of predetermine time intervals is provided, which controls the selection circuit (3) so that the respective antennas (2a,2b) are sequentially connected with the receiver one after the other at respective predetermined time intervals required for detection of a special radio signal designed for the particular radio receiver or for detection of a radio signal in the radio channel.

18 Claims, 8 Drawing Sheets

RADIO SYSTEM FOR REMOTE CONTROL OPERATION IN A STATIONARY VEHICLE

BACKGROUND OF THE INVENTION

The present invention relates to a radio system for remote control operation in a stationary vehicle by transmitting high frequency radio signals in the meter wavelength band with a radio transmitter located outside the vehicle, which transmits radio signals in a predetermined radio channel designed only for a receiver located in the vehicle.

Radio systems of this type are known from every day applications, such as vehicular telemetry devices for operation of the vehicle central lock mechanism, heating and similar remote control functions. A high degree of reliability is required for vehicle central lock mechanisms, in which the vehicle is opened with a coded signal from a hand-held transmitter acting as an electronic key. This type of device has two main problem areas. First, the transmitter power should be kept as small as possible because of the miniature battery provided in the small hand transmitter. Inside of a predetermined maximum operating radius of a few tens of meters around the vehicle it should be reliably opened by initiating a radio signal from the hand transmitter device designed for the receiver in the vehicle. In order to prevent undesired opening of the vehicle by erroneous operation of the hand transmitter outside of this predetermined maximum operating radius, it is desirable that the inner radius of the area, in which response of the receiver can be practically prevented, is not substantially larger than the predetermined maximum operating radius for the transmitter device. This condition can be fulfilled only very poorly with antenna apparatus used in practice with a single antenna because of multi-path propagation and difficulties with polarization dependent and omnidirectional antennas. Furthermore the transmission polarizations are also not well defined or definite because of the indefinite or arbitrary manipulation of the transmitter acting as key, so that in principle omnidirectionality for arbitrary polarization should be provided.

The area within the predetermined maximum operating radius 18 and the inner radius 19 of the area in which erroneous operation can be prevented are illustrated in FIG. 10.

Integrated vehicle antennas have especially pronounced indentations in their directional characteristic diagram because of the influence of the vehicle chassis. In order to achieve reliable response within the range of this predetermined maximum operating radius in the azimuthal direction at these indentations, it is necessary to select a transmitter power for which the sensitivity attainable in the receiver is sufficiently large, so that an undesirably large range for receiver response is obtained in other azimuthal directions at pronounced maxima in the directional characteristic diagram.

SUMMARY OF THE INVENTION

It is an object of the present invention to provide an improved radio system for remote control operation in a stationary vehicle that does not suffer from the above-described disadvantages.

It is an object of the present invention to provide a radio system for remote control operation in a stationary vehicle of the above-described kind, with which remote operation is more reliable inside an area having a predetermined maximum operating radius as the distance from the vehicle and an inner radius of an area in which undesired response of the receiver because of erroneous commands or because of undesired radio signals for operation of other vehicles can be practically prevented is larger than the maximum operating radius by as small a factor as possible.

These objects and others which will be made more apparent hereinafter are attained in a radio system for remote control operation in a stationary vehicle of the above-described kind by means of a high frequency radio transmission in the meter wavelength range with a radio transmitter located outside of the vehicle for transmitting only certain predetermined radio signals in a predetermined radio channel or band designed to be received only by a receiver located in the vehicle.

According to the invention the radio system comprises a radio receiver located in the vehicle; a radio transmitter located outside of the vehicle for transmitting predetermined radio signals in a predetermined radio channel designed to be received only by the radio receiver located in the vehicle; at least two receiving antennas in the vehicle; means for decoupling the at least two receiving antennas for diversity-type operation in the frequency band of the radio channel; a selection circuit connected with the receiving antennas, the selection circuit including switching means for connecting the respective receiving antennas one at a time to the receiver when the receiver is tuned to the radio channel and put in a ready mode and a clock including means for setting predetermined time intervals and means for controlling the selection circuit according to the time intervals, whereby the respective antennas are sequentially connected with the receiver one after the other for the respective time intervals required for detection of a special radio signal designed for the radio receiver or of a radio signal in the radio channel.

A diversity-type decoupling of the receiving antennas in the vehicle occurs when the received signals differ in regard to the reductions or interruptions of the high frequency gain. With a sufficient number of correspondingly decoupled antennas found in the vehicle the probability is correspondingly large that at least one of the antennas has no pronounced gain reduction in its received signal at the given conditions of the radio field. Antennas with a selection circuit in the sense of the present invention can similarly be provided by an antenna device with a controllable switching circuit, as it is described in German Patent Document DE 196 07 045 in FIGS. 1 to 3 and in FIG. 4. In that reference the antennas are decoupled from each other in a diversity-type manner, among other things, because different antenna properties are desired by switching the complex antenna structures.

The transmitter power can thus be selected small so that a reliable response of the receiver with a given receiver sensitivity is guaranteed with the prerequisite of avoiding pronounced gain reductions at the predetermined maximum effective operating radius. The invention has the advantage that with a larger number of selected antennas, the required transmission power required for the predetermined maximum effective operating radius for reliable response is largely independent of a given radio field, which results from the surroundings of the stationary vehicle and the position of the transmitter.

Preferred embodiments of the invention are described in the following detailed description and in the appended claims.

BRIEF DESCRIPTION OF THE DRAWING

The objects, features and advantages of the invention will now be illustrated in more detail with the aid of the following description of the preferred embodiments, with reference to the accompanying figures in which:

FIG. 11 b) is a detailed view of the graphical illustration of FIG. 11 a) only showing the probability distribution for the range between 0 and 2%.

DESCRIPTION OF THE PREFERRED EMBODIMENTS

Figure 1:
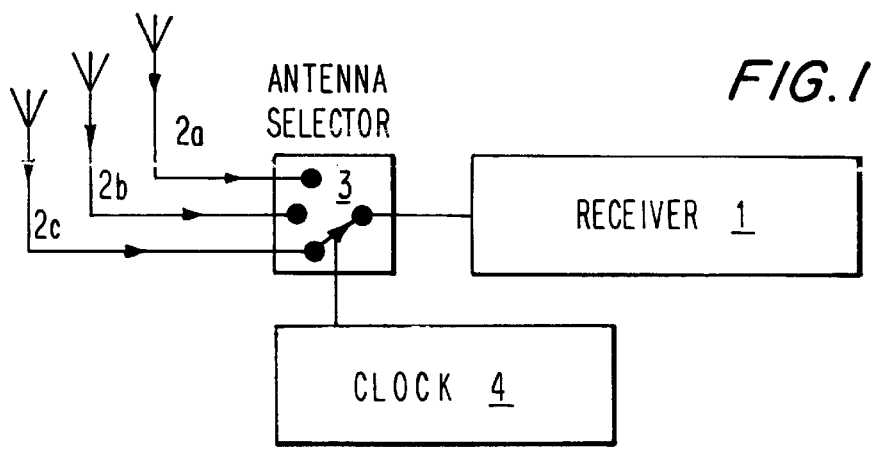
FIG. 1 is a diagrammatic illustration of a part of the radio system according to the invention with diversity antennas 2a,2b,2c with selection circuit 3, receiver circuit 1 and clock 4 for sequential switching of the antennas according to the invention.

Essential remote control operations are performed next after identification of the transmitted signal in the radio system for remote control operation according to the invention. So that transmitted signal can be reliably received independently of the manner in which the transmitter is held and its polarization, it is necessary to use several antennas according to the invention in the reception system. Because of the situation that an antenna characteristic arises and gain reductions cannot be avoided because of the time invariant superposition of several received signals, according to the invention the several antennas are sequentially switched as shown in FIG. 1. The receiver is put in a ready mode prior to initiating a high frequency signal and switched by means of a selection circuit 3 at predetermined adjustable time intervals established with a clock 4.

Figure 2:
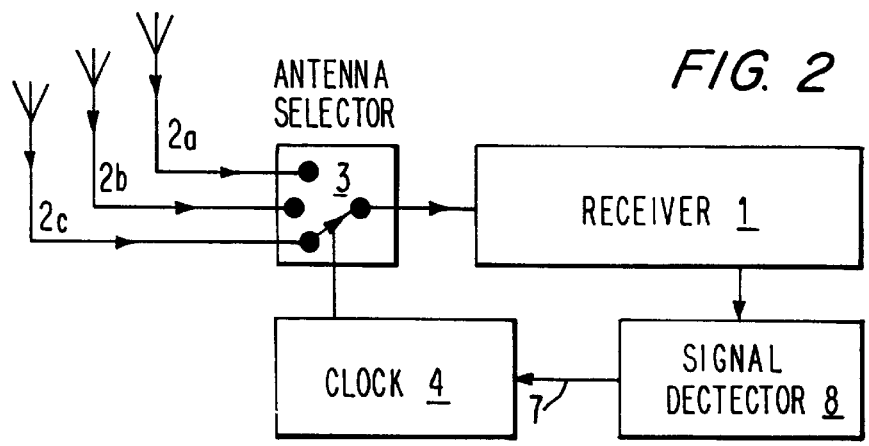
FIG. 2 is a diagrammatic illustration of a radio system according to the invention with the parts shown in FIG. 1 and with a signal detection unit 8 for issuing a stop signal 7 for halting the clock 4.
Figure 3:
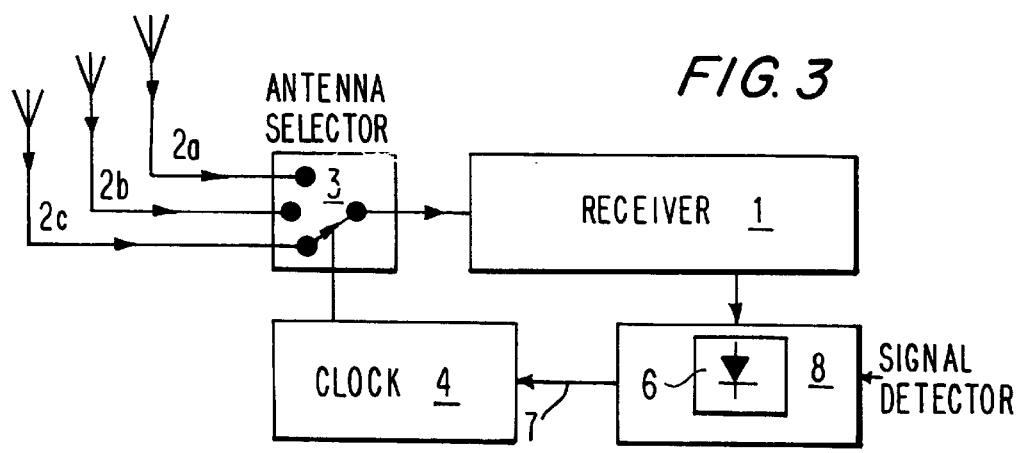
FIG. 3 is a diagrammatic illustration of the radio system according to the invention with the parts shown in FIG. 1 and with a signal detection unit 8 for pre-identification of the transmitted signal, which includes a high frequency gain detector 6.

After detection of the message designed for receiver 1 in the signal detection device 8 shown in FIG. 2 a stop signal 7 is generated and acts on the clock 4 so that no further switching of the selection circuit 3 occurs and the following message is timely received with the antenna, which would include the operating signal in the message. Thus the ready mode of the receiver is ended and it operates. A preliminary identification of a high frequency signal for remote control operation in a narrow radio band, such as at frequencies of 315 MHz and 433 MHz, can occur, as shown in FIG. 3, with the help of a high frequency (HF) gain detector 6 within the signal detection device 8. After the preliminary identification the receiver 1 can be activated to full current reception in an advantageous manner and the final identification of the transmitted signal can occur. In other embodiments of the invention a specific continuous modulation of the high frequency carrier in the transmitter can occur for pre-identification. In that case a demodulator is used in the signal detection device 8 for detection of the specific modulation.

Figure 4:
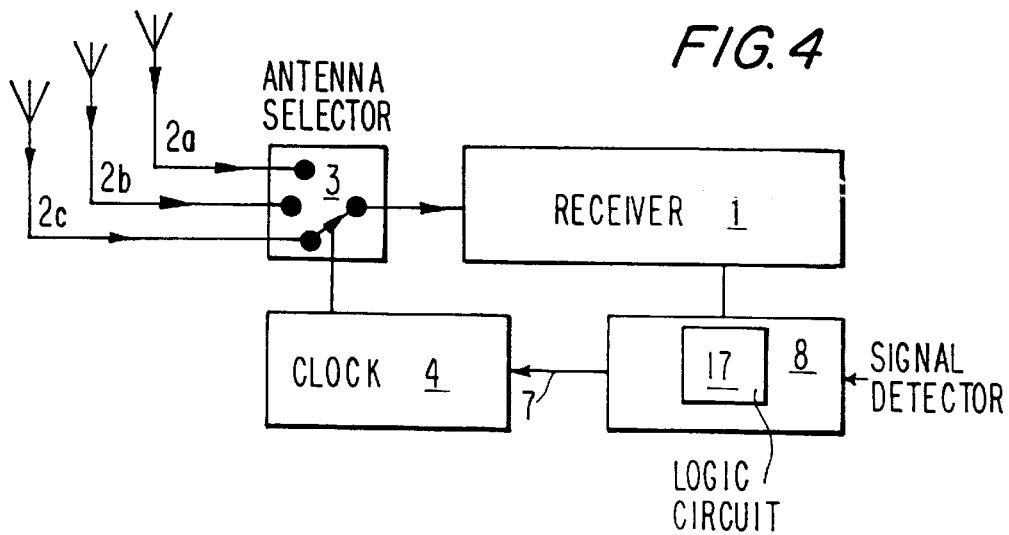
FIG. 4 is a diagrammatic illustration of a radio system according to the invention with the parts shown in FIG. 1 and with an identification logic circuit 17 for identification of the digitally coded signal.
Figure 5:
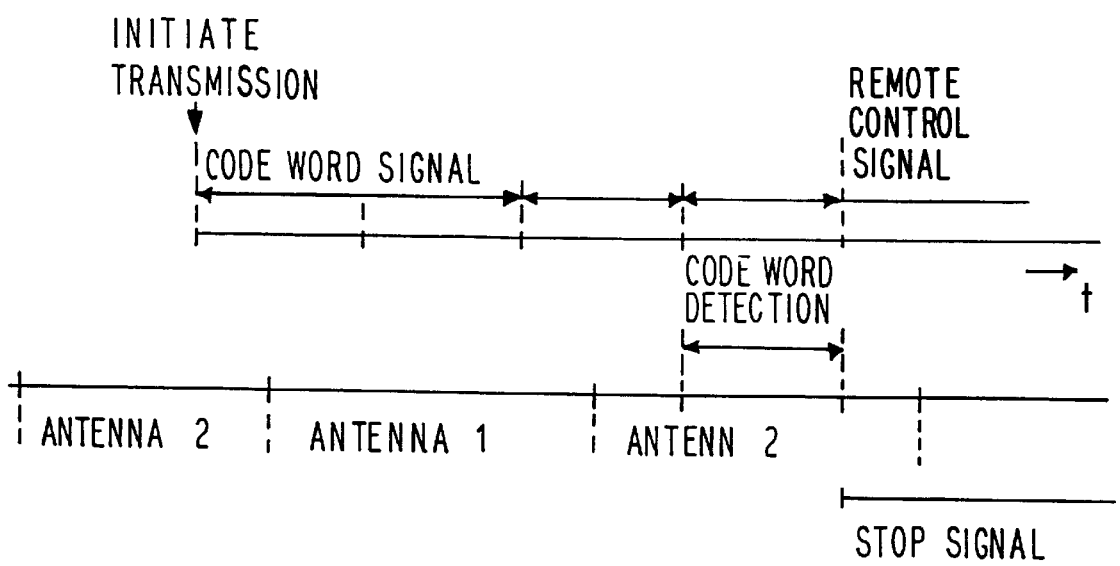
FIG. 5 is a timing diagram after initial transmission from the hand-held transmitter with multiple (four times) repetition of a coded key word and timely remote control operation and of the sequential switching of antenna 1 and antenna 2 of a two antenna diversity unit showing identification of the key word characteristic with antenna 2 and subsequently stop signal for fixing the connection to antenna 2.

An extremely advantageous method for detection of the transmitted signal includes the transmission of a digital code or key word in a known manner. This can occur with an identification logic circuit 17 in the signal detection device as shown in FIG. 4. According to the invention it is advantageous when the key or code word is transmitted many times so that it is guaranteed that an antenna, whose received signal is unaffected by a gain reduction or interruption, can feed this signal to the receiver 1 for detection. In order to guarantee this the time intervals for switching of the antennas are selected in an appropriate manner so that they are at least twice as long as the length of the digital code word. An example of this process is shown in FIG. 5. Thus when N antennas are used the code words that are transmitted should be at least 2N times.

Figure 6:
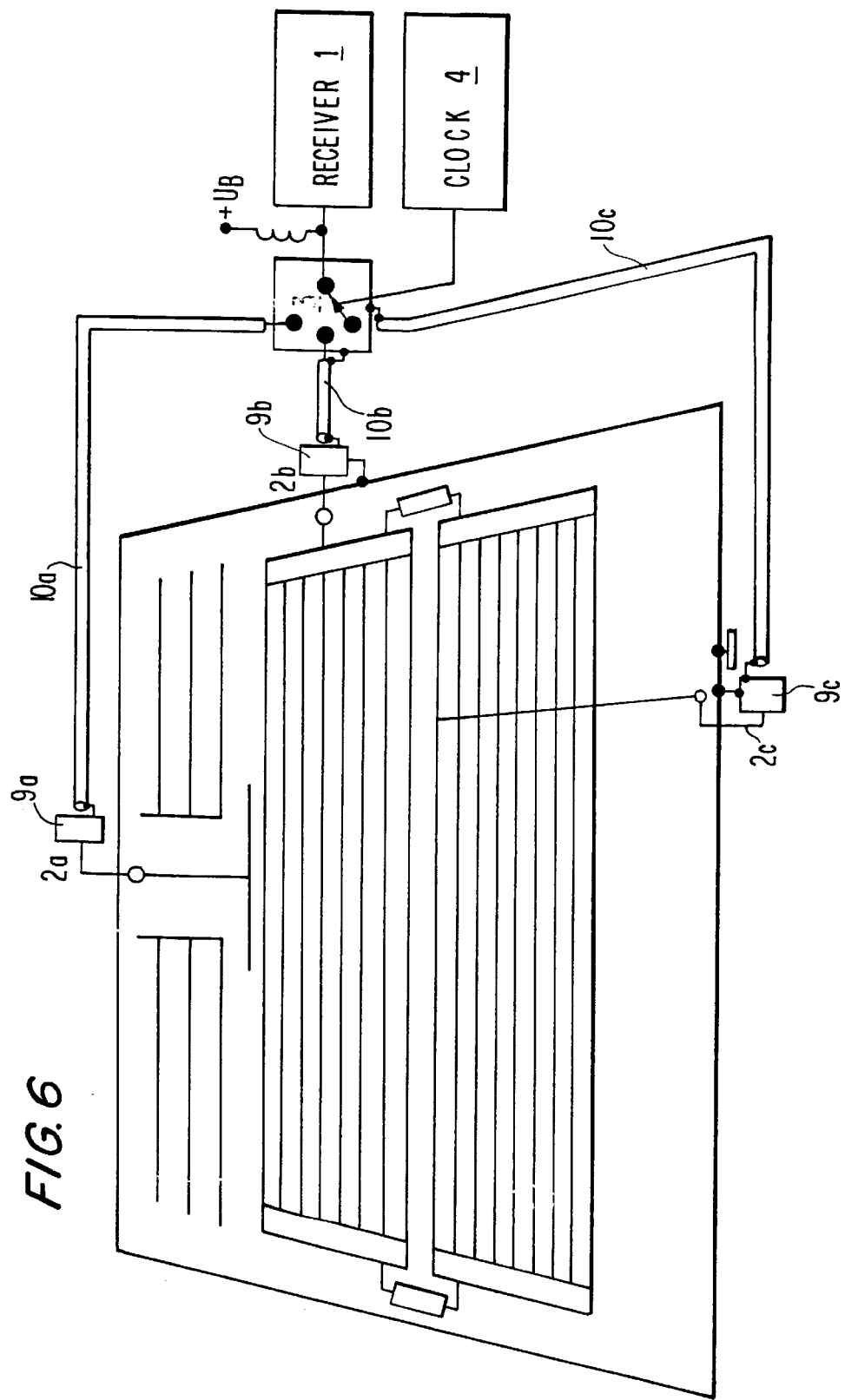
FIG. 6 is a diagrammatic view of a part of the radio system according to the invention including the radio receiver and three antennas on the rear window of a vehicle with different antenna connector positions for diversity decoupling.

A three antenna receiving apparatus for a radio system according to the invention is shown in FIG. 6. All antennas are mounted on the rear window of a motor vehicle. Frequently multi-antenna diversity systems are used for television reception in vehicles. The received signals for remote control operations can be received in an advantageous manner with these antennas.

Figure 7:
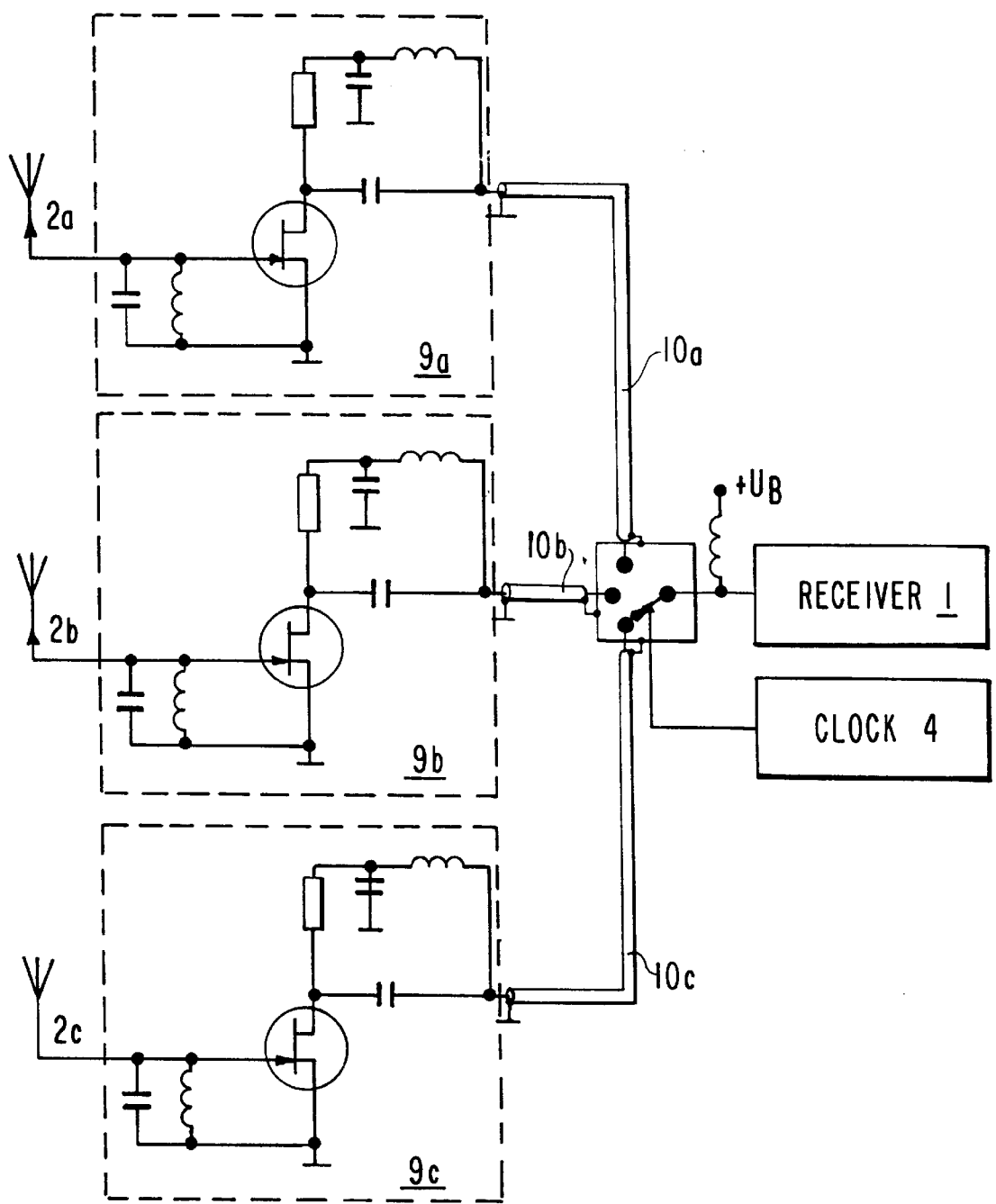
FIG. 7 is a diagrammatic view of a part of a radio system according to the invention including a receiver with active antennas with channel-selective signal/noise optimization circuitry.
Figure 8:
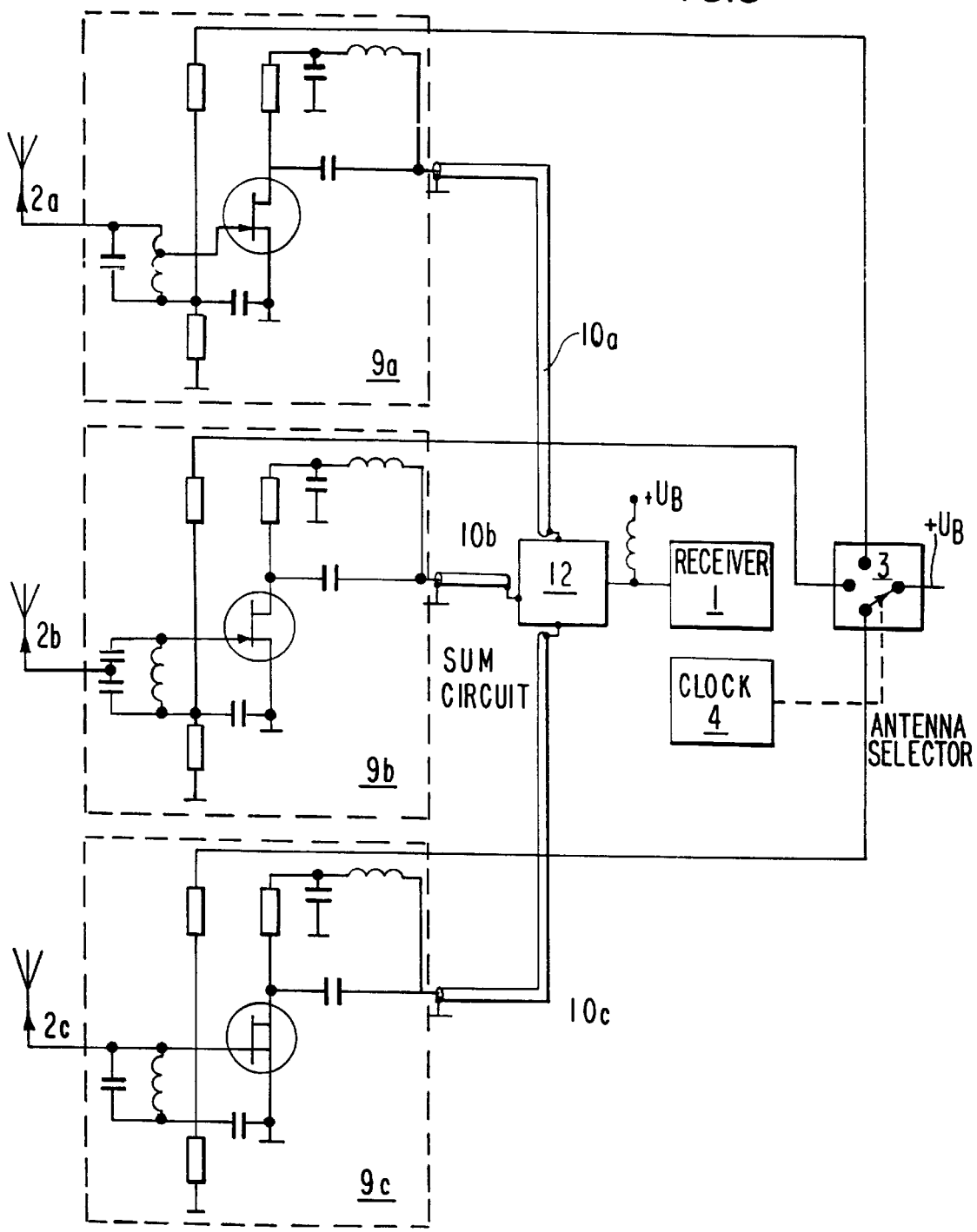
FIG. 8 is a diagrammatic view of a part of a radio system according to the invention including a receiver with active antennas as in FIG. 7 with a selection circuit 3 acting by simultaneous current-saving sequential connection of control electrode bias voltage to the active elements.

Because of the narrow bandwidth of the available radio channels for remote control operation highly sensitive active antennas, such as in FIG. 7, can be constructed with channel selective optimized signal/noise ratio. In order to save current during the ready mode it is advantageous to provide only the active antenna that is switched through to the receiver with stand-by current. It is advantageous to incorporate the selection function in the active antenna circuitry, based on the current consumption of an actual selection circuit 3 with electronic components. That is accomplished because, as shown in FIG. 8, only the small current required for the biasing of the control electrodes of the active elements for switching the antennas is actually switched.

Figure 9:
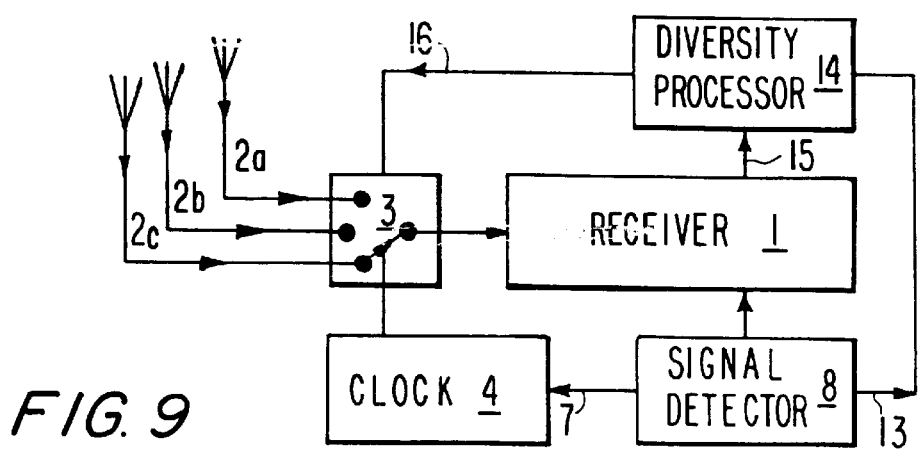
FIG. 9 is a diagrammatic view of a part of a radio system according to the invention as shown in FIGS. 1 to 4 but also with a diversity processor 14, in which a start signal 13 for activation of the diversity processor 14 for evaluation of the signal 15 supplied by the receiver and a switching signal 16 for activation of the switching circuit 3 are also illustrated.
Figure 10:
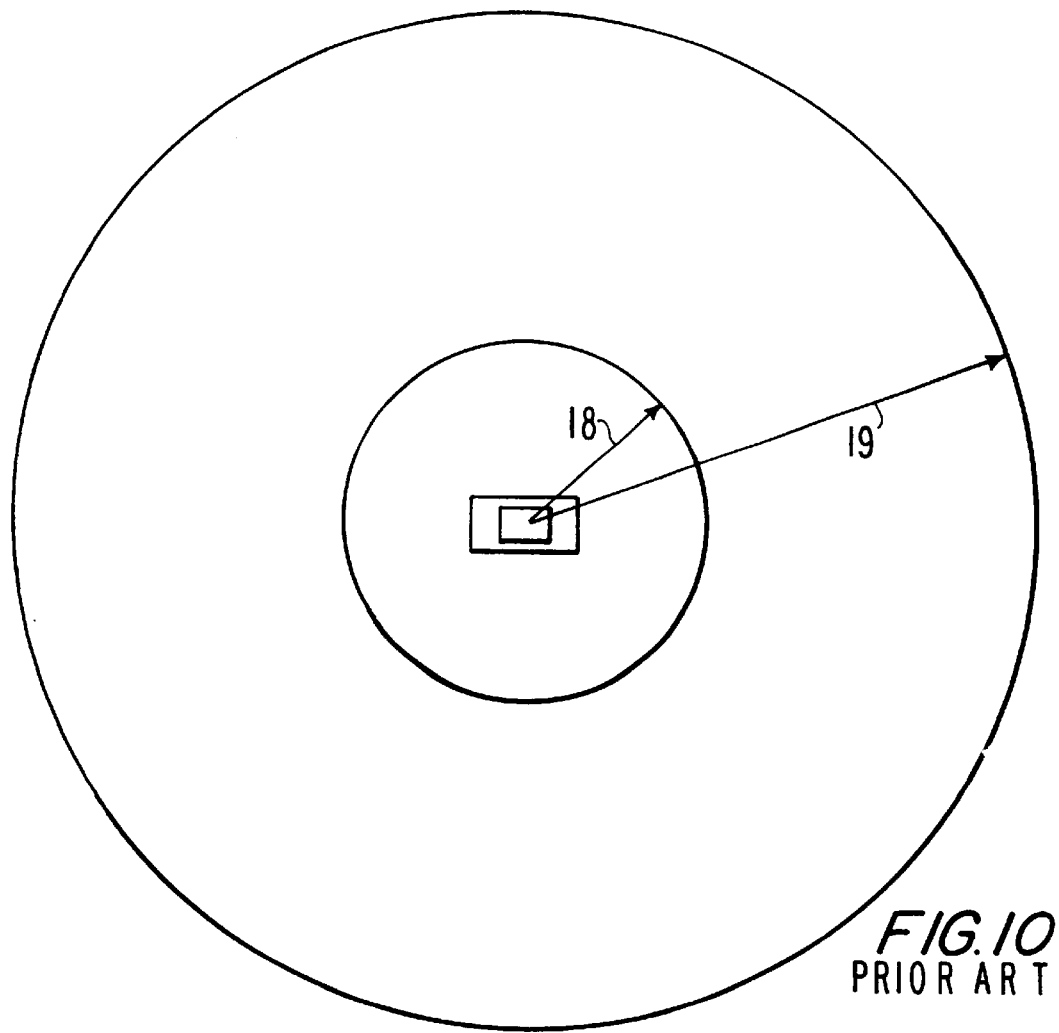
FIG. 10 is a diagrammatic illustration of the effective area with predetermined maximum effective operation radius 18 for response and the area with inner radius 19 for preventing erroneous or faulty operational.

The outputs of the antennas are directly connected to a summation circuit 12 that is connected directly to the receiver without switching. During the transmission of the remote control signal frequently the transmitter moves in relation to the stationary vehicle. Because of that the same problems occur which occur in multi-path propagation with signal interruption. It is therefore advantageous after detection of the signal and issuing a stop signal 7 to activate a diversity processor 14 with the help of a start signal 13. This produces a test signal 15 from the receiver 1 as shown in FIG. 9 which is evaluated in the diversity processor 14 according to known criteria in regard to its usability for telemetric operations. When this signal is not useable the diversity processor 14 generates a diversity switching signal 16 which is fed to the selection circuit 3 and again switches it.

EXAMPLE

The invention has the advantage that with a larger number of selected antennas, the required transmission power required for the predetermined maximum effective operating radius for reliable response is largely independent of a given radio field, which results from the surroundings of the stationary vehicle and the position of the transmitter.

This situation is clearly illustrated in the following with the aid of an example of a Rayleigh distribution. The probability distribution for falling below the high frequency gain for a single antenna and for the largest respective signal from three antennas versus the high frequency gain is illustrated graphically in FIG. 11a. If one requires, for example, a responsiveness of 99% at the predetermined maximum operating radius 18, this corresponds to a probability for gain reduction of 1%.

Figure 11A:
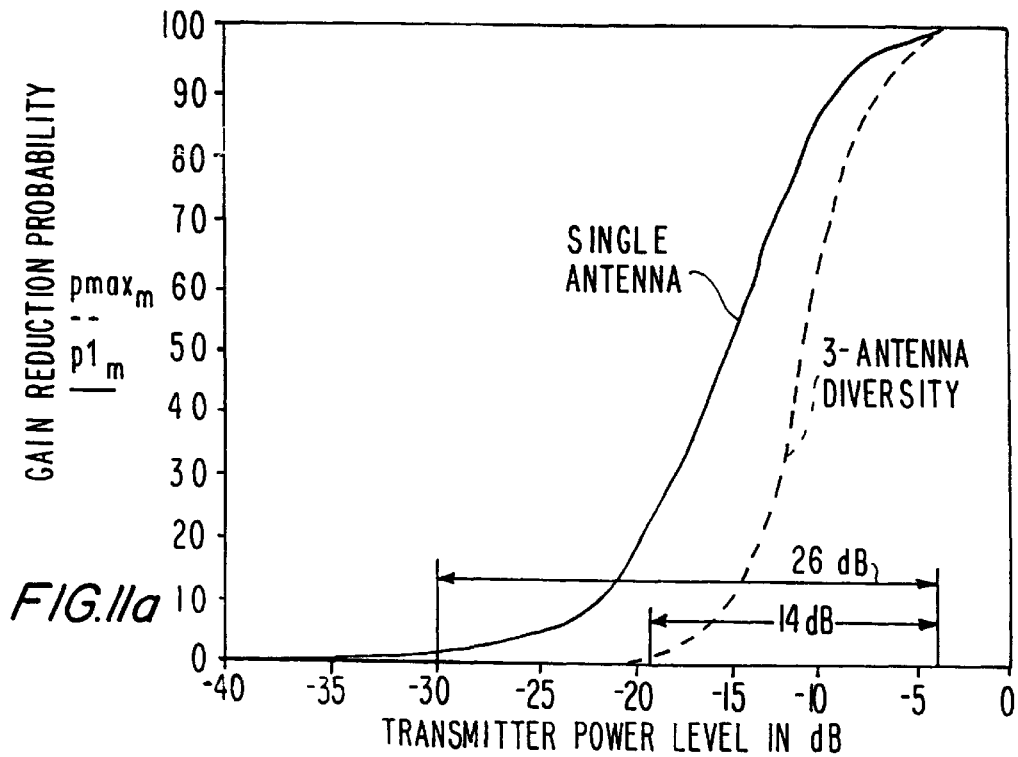
FIG. 11 a) is a graphical illustration showing the relationship of the probability distribution for high frequency gain reduction for a single antenna and that of the respective greater signal of the three antennas according to the invention to the high frequency gain of a Rayleigh Field distribution.
Figure 11B:
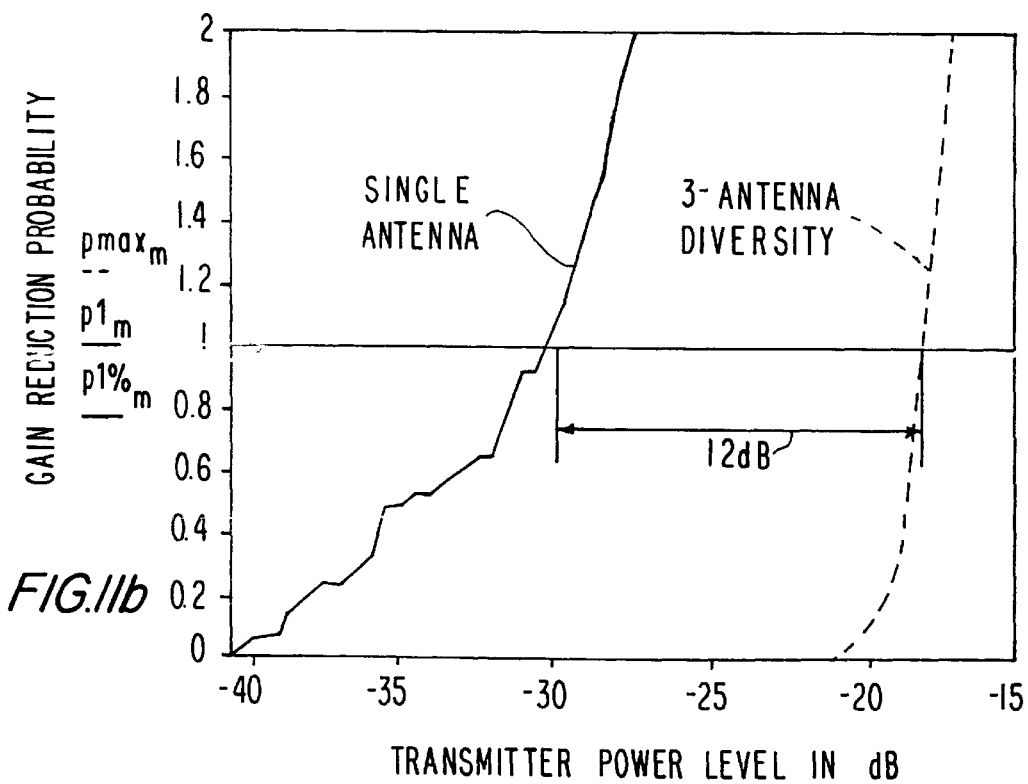
Figure 12:
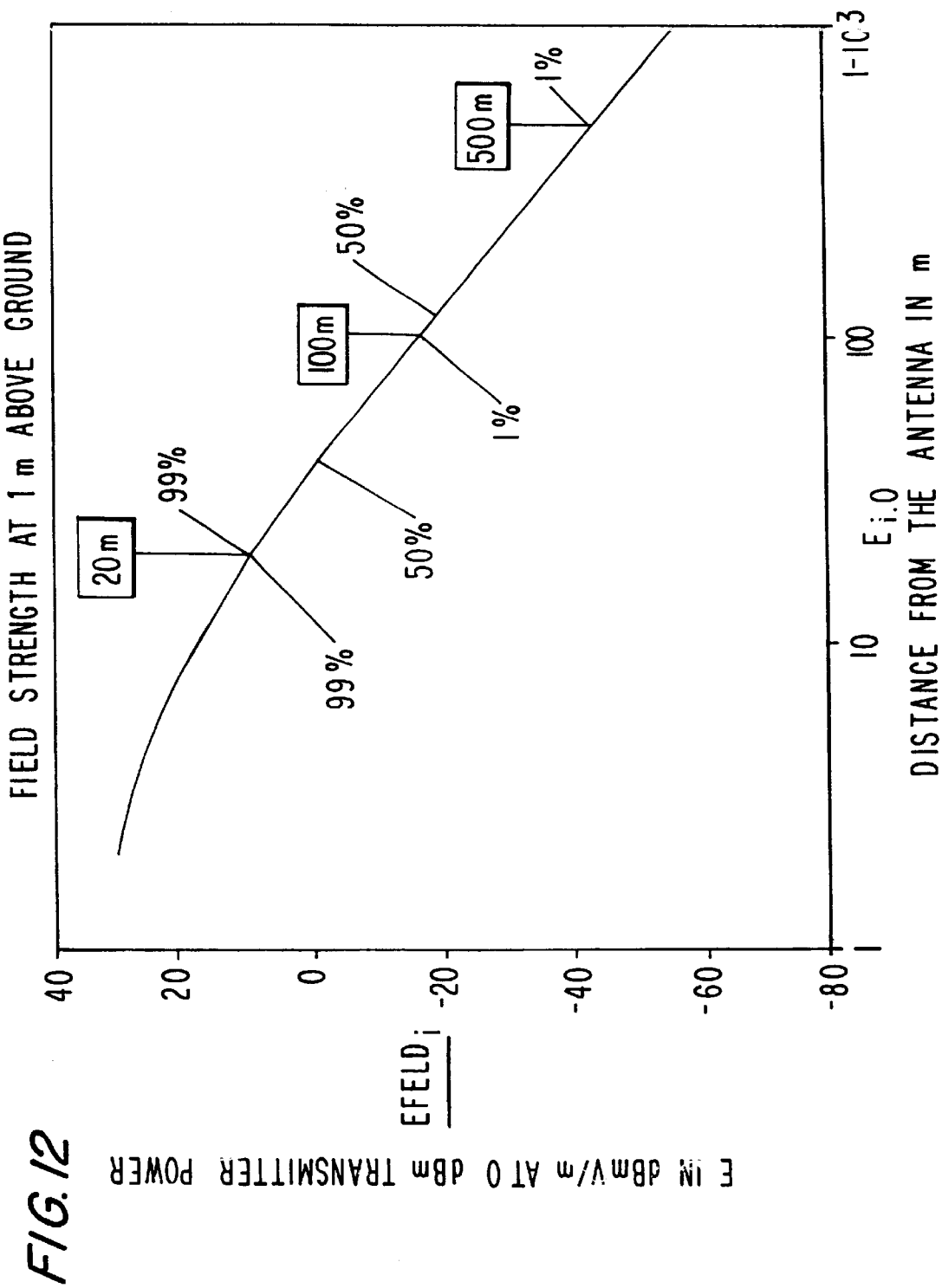
FIG. 12 is a graphical illustration showing the dependence of the probability of remote control operation on distance from the antenna for an individual antenna system (percentage numbers above the curve) and a 3-antenna diversity reception system (percentage numbers below the curve).

This region of FIG. 11a is shown in more detail in FIG. 11b. Thus the transmission level in this example can be selected to be about 12 dB smaller with the same response reliability. Because of that the dashed curve in FIG. 11a is shifted about 12 dB to smaller gain values. The radius 19 on the other hand can be derived from the probability of gain reduction from FIG. 11a from the gain difference for the points 1% and 99% . This gain difference amounts to 26 dB for an individual antenna 26 and to 14 dB for a three antenna diversity system. The different ranges result from the curve in FIG. 12, which has typical average field strength behavior, without Rayleigh fading, over the distance. If the transmission power both for the individual antenna and also for the 3-antenna diversity system is adjusted so that an operating probability of 99% results at a predetermined maximum operating radius 18 of 20 m, in the case of the individual antenna the operating probability has dropped to 1% at a distance of 500 m (percentage numbers above the curve in FIG. 12).

In contrast with a three antenna receiving apparatus according to the invention the operating probability is already dropped to 1% at a radius of 100 m. The Rayleigh distribution set forth here serves as an example for the advantages and operability of the invention and is not completely true in its detailed form, especially in conventional parking places and the observed small spaces, however the received amplitudes for the given transmitter at a given distance have smaller fluctuations than those for the receiver with a single antenna. Thus a smaller ratio of the inner radius 19 and the predetermined maximum operating radius 18 results for the invention.

The disclosure in German Patent Application DE 198 23 237.3 of May 25, 1998 is incorporated here by reference.

This German Patent Application describes the invention described hereinabove and claimed in the claims appended hereinbelow and provides the basis for a claim of priority for the instant invention under 35 U.S.C. 119 .

While the invention has been illustrated and described as embodied in a radio system for remote control operation in a stationary vehicle, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A radio system for remote control operation in a stationary vehicle by means of a high frequency radio transmission in a one meter wavelength band comprising a radio receiver (1) located in the vehicle;

a radio transmitter outside of the vehicle for transmitting a predetermined radio signal for remote control operation in a predetermined radio channel designed to be received only by the radio receiver located in the vehicle;

at least two receiving antennas (2a,2b) in the vehicle (5);

means for decoupling said at least two receiving antennas (2a,2b) for diversity-type operation in said frequency band of said radio channel, said means for decoupling including a selection circuit (3) connected with said at least two receiving antennas (2a,2b), said selection circuit (3) including switching means for connecting respective ones of said at least two receiving antennas (2a,2b) one at a time to said receiver (1) when said receiver (1) is tuned to said radio channel and put in a ready mode and a clock (4) including means for setting predetermined time intervals at which said switching means operates to switch said antennas and means for controlling said selection circuit (3) according to said predetermined time intervals;

whereby respective ones of said at least two antennas (2a,2b) are sequentially connected with said receiver one after the other at said predetermined time intervals required for detection of the radio signal designed to be received by said radio receiver in said radio channel.

2. The radio system as defined in claim 1, wherein said radio transmitter includes means for propagating a modulated high frequency carrier for identification of the transmitter and for activation of the remote control operation, said radio receiver (1) includes a signal detection device (8) comprising means for generating a stop signal (7) when the radio signal designed for the receiver is received in the receiver and said clock (4) is connected with said signal detection device (8) to receive said stop signal (7), whereby said sequential switching of said selection circuit (3) is halted, so that a message including information identifying said transmitter device and a command activating the remote control operation are passed through to said radio receiver (1) from the one of said at least two antennas which has received said modulated high frequency carrier.

3. The radio system as defined in claim 2, wherein said signal detection device (8) contains means for high frequency gain detection and said stop signal (7) is generated when a high frequency gain detected by said means for high frequency gain detection reaches a predetermined value.

4. The radio system as defined in claim 2, wherein said transmitter includes means for specific continuous modulation of said high frequency carrier for pre-identification of a transmitted signal for said receiver (1) and said signal detection device (8) includes means for demodulating to detect said specific continuous modulation for the pre-identification.

5. The radio system as defined in claim 2, wherein said radio transmitter including means for generating a code signal for identifying the transmitter and for activating the remote control operation, said radio receiver (1) includes a signal detection device (8), said signal detection device comprises an identification logic circuit (17) for detection of said code signal and means for generating a stop signal (7) when said code signal is identified by said identification logic circuit (17) and said clock (4) is connected with said signal detection device (8) to receive said stop signal (7), wherein said predetermined time intervals set by said clock (4) for connecting respective ones of said at least two antennas to said receiver (1) are longer than a duration of said code signal by a sufficient amount, so that a message including information identifying said transmitter (1) and a command activating said remote control operation are passed through to said radio receiver (1) from the one of said at least two antennas with which said code signal has been received.

6. The radio system as defined in claim 5, wherein the code signal is a digital code word and further comprising means for multiple repetitions of said digital code word in a data protocol prior to transmitting a digital message for performing the remote control operation to provide a reliable detection of said digital code word and wherein said predetermined time intervals are at least twice as long as a temporal duration of said digital code word and a number of said multiple repetitions of said digital code word is at least twice a number of said at least two antennas.

7. The radio system as defined in claim 2, wherein said at least two antennas are active antennas provided with means for channel selective signal/noise optimization for improvement of noise sensitivity.

8. The radio system as defined in claim 7, each of said active antennas has a stand-by direct current only in the ones of said predetermined time intervals during which said active antenna is connected to said receiver for saving current in a ready mode of the receiver.

9. The radio system as defined in claim 8, further comprising a summation circuit (12) for combining output signals from said active antennas and wherein said selection circuit (3) controlled by said clock (4) is constructed with a current saving electronic circuit to distribute a biasing voltage to control electrodes of active elements for switching said active antennas in order to provide the stand-by current for the active antenna sequentially connected with the receiver.

10. The radio systems as defined in claim 9, further comprising a diversity processor (14) and wherein said signal detection device (8) includes means and generating a start signal (13) after said stop signal (7) is issued by said signal detection device, and receiver (1) includes means for generating a test signal (15) from the radio signal received therein, said diversity processor (14) is connected to said signal detection device (8) and said receiver (1) to receive said start signal (13) and is thereby activated to receive and receives said test signal (15) and said diversity processor (14) includes means for evaluating said test signal for telemetric operation and means for generating a diversity switching signal (16) when said test signal is unsuitable for telemetric operation and wherein said diversity switching signal (16) is fed to said selection circuit (3) and switches said selection circuit (3) when received thereby.

11. The radio system as defined in claim 1, wherein at least one of said at least two antennas is suitable for reception of horizontally polarized waves and at least one other of said at least two antennas is suitable for reception of vertically polarized waves.

12. The radio system as defined in claim 1, wherein said at least two antennas have an azimuthal antenna characteristic pattern with gain indentations or depressions that are non-coincident.

13. The radio system as defined in claim 1, wherein said at least two antennas are mounted on a rear window of said vehicle.

14. The radio systems as defined in claim 1, wherein at least one of said at least two antennas is mounted on a front portion of said vehicle and at least one other of said at least two antennas is mounted on a rear portion of said vehicle to avoid spurious signals in reception.

15. The radio systems as defined in claim 1, wherein at least one of said at least two antennas is mounted on a front bumper of said vehicle and at least one other of said at least two antennas is mounted on a rear bumper of said vehicle.

16. The radio systems as defined in claim 1, wherein at least one of said at least two antennas is mounted on a front bumper of said vehicle and at least one other of said at least two antennas is mounted on a rear window of said vehicle.

17. The radio systems as defined in claim 1, wherein at least one of said at least two antennas is mounted on an outer mirror or inner mirror of said vehicle and at least one other of said at least two antennas is mounted on a rear window of said vehicle.

18. The radio systems as defined in claim 1, wherein at least one of said at least two antennas is mounted on a side window of said vehicle and at least one other of said at least two antennas is mounted on a rear window of said vehicle.

* * * * *